United States Patent [19]
Bennett et al.

[11] Patent Number: 5,515,438
[45] Date of Patent: May 7, 1996

[54] QUANTUM KEY DISTRIBUTION USING NON-ORTHOGONAL MACROSCOPIC SIGNALS

[75] Inventors: Charles H. Bennett, Croton-on-Hudson, N.Y.; Stephen J. Wiesner, Mitzpe Ramon, Israel

[73] Assignee: International Business Machines Corporation, Armonk, N.Y.; a part interest

[21] Appl. No.: 158,117

[22] Filed: Nov. 24, 1993

[51] Int. Cl.⁶ .................................................. H04L 9/00
[52] U.S. Cl. .................... 380/21; 380/44; 359/112
[58] Field of Search ................... 380/21, 44, 59, 380/43, 33, 54; 359/112, 118

[56] References Cited

U.S. PATENT DOCUMENTS

| | | | |
|---|---|---|---|
| 4,866,699 | 9/1989 | Brackett et al. | 370/3 |
| 4,879,763 | 11/1989 | Wood | 455/607 |
| 4,903,339 | 2/1990 | Solomon | 455/612 |
| 4,965,856 | 10/1990 | Swanic | 455/617 |
| 5,140,636 | 8/1992 | Albares | 380/54 |
| 5,191,614 | 3/1993 | LeCong | 380/49 |
| 5,307,410 | 4/1994 | Bennett | 380/21 |

*Primary Examiner*—David C. Cain
*Attorney, Agent, or Firm*—Robert M. Trepp

[57] ABSTRACT

Quantum key distribution (QKD) uses non-orthogonal quantum states to distribute random information, suitable for use as a key for encryption and authentication, between two users who share secret information initially, with the assurance, based on the uncertainty principle, that it is unknown to anyone else. The present invention, which can be used with a fiberoptic channel or an unguided light beam, differs from previous QKD schemes in using macroscopic signals instead of single photons. The invention solves the problem of stray light and cost by using signals which are more efficient, and less noisy than photon-counting detectors at the wavelengths where optical fibers are most transparent.

15 Claims, 2 Drawing Sheets

QUANTUM KEY DISTRIBUTION USING NON-ORTHOGONAL MACROSCOPIC SIGNALS

DESCRIPTION

1. Field of the Invention

This invention relates to secure communications via optical or other electromagnetic radiation, and more particularly to communications systems in which the uncertainty principle of quantum physics is exploited to allow legitimate users to be confident that cryptographic key information distributed over the system remains secret from any eavesdropper who may be monitoring their communications.

2. Background of the Invention

If two users possess shared random secret information ("key") they can achieve, with provable security, the two chief goals of cryptography: 1) making their messages unintelligible to an eavesdropper (one-time-pad encryption achieves this) and 2) distinguishing legitimate messages from forged or altered ones (informationally secure mathematical authentication techniques achieve this). One such technique is described in a publication by N.N. Wegman and J.L. Carter "New hash functions and their application to authentication and set equality", in Journal of Computer and System Sciences, 22, 265, (1981). Unfortunately, both one-time-pad encryption and Wegman-Carter authentication consume key information and render the key unfit for re-use. Therefore some means of distributing fresh key information is needed.

One way of doing so is by carrying a material storage medium such as magnetic tape, containing a copy of the fresh key, from one user to the other. Such a key is good only between the two users who have copies of it, and its security depends on its having been continually protected from inspection not only during its transport from one user to the other, but during the entire time from its generation until its destruction after the users have used it to encrypt or authenticate a particular message and no longer need it. The logistic problems of key distribution and storage are so great that many applications, such as secure telephones, instead use purely mathematical techniques by which two users, who may not have anticipated their need to communicate secretly, can nevertheless agree over an insecure telephone line on a "session key" which they use to encrypt the ensuing conversation and then destroy. Unfortunately all such mathematical techniques for key agreement over an unprotected channel rest on unproven assumptions such as the difficulty of factoring large numbers.

Quantum key distribution (henceforth QKD) allows two users to agree on a secret key in a similarly impromptu manner, just before it is needed, but with provable security based on the uncertainty principle of quantum physics. To do so, the users need not exchange any material medium, but instead use a communications channel of a particular physical form, capable of transmitting signals that are non-orthogonal as quantum states. Because of the uncertainty principle, such signals cannot be monitored accurately by an eavesdropper, and the attempt to monitor them disturbs them in a way that can be detected by the legitimate users of the channel. A practical scheme for QKD was described in a publication by C.H. Bennett, the inventor herein, and G. Brassard, in "Quantum Public Key Distribution System", IBM Technical Disclosure Bulletin 28, 3153–3163 (1985), and was implemented experimentally by C.H. Bennett el. al. as described in an article "Experimental Quantum Cryptography," in J. of Cryptology 5, 3–28 (1992). Bennett described a fiberoptic interferometric version of QKD in a publication entitled "Quantum Cryptography Using any Two Nonorthogonal States" Phys. Rev. Lett. 68, 3121–3124 (1992). Recently several other implementations of QKD have been described, including an article by Townsend, el. al. "Single Photon Interference in a 10 km long optical fibre interferometer", Electronics Letters 29, 634 (1993).

In all these schemes, after the quantum signals have been sent and received, the sender and receiver exchange messages through a second channel, called the "public channel", which may be of any physical form for example via radio. These messages, which need not be kept secret from the eavesdropper, allow the legitimate sender and receiver to assess the extent of disturbance of the quantum signals by eavesdropping and noise in the channel and by detectors, and, if the disturbance has not been too great, to distill from the sent and received versions of the quantum signals a smaller body of random key information which with high probability is known to the sender and receiver but to no one else.

The public channel messages must be mathematically authenticated or otherwise protected against alteration or substitution, but they need not be kept secret. It should be emphasized that no effort need be made to guard the quantum channel against passive or active wiretapping, because even if an eavesdropper did tap into it, the eavesdropper could not gain significant information about the key without introducing so much disturbance as to be detected.

SUMMARY OF THE INVENTION

Having a quantum channel, a QKD system wherein the quantum channel's resistance to eavesdropping is achieved by using macroscopic signals (eg light pulses of $N>1$ expected photons) provided these more intense signals representing a "1" or "0" differ only slightly (by $1/\sqrt{N}$ or less) in their macroscopic parameters, such as polarization, intensity, and phase. Macroscopic signals have several advantages, notably the fact that they are more resistant to background radiation such as stray light, and the fact that they can be detected by analog detectors, which can be cheaper, more efficient, and less noisy at wavelengths in the range from where optical fibers are most transparent.

One embodiment of a QKD system consists of

- one or more sending units, each containing a physical means of generating a true (not pseudo-) random bit sequence $X=X(1), X(2), X(3) \ldots X(m)$, and a publicly known modulation scheme for producing two electromagnetic signals $R(t)$ and $S(t)$, (where t de notes continuous time) in a manner determined by the bit sequence X. The sending units are connected by 2. a quantum channel, containing two mutually phase-coherent subchannels, and
3. a two-way classical public channel, to
4. one or more receiving units, each of which also contains a physical means of generating true random bits.
5. Also included in the invention is a protocol for coordinating the use of the above components so as to allow any sending unit and any receiving unit to agree on a certifiably shared secret key, or else to conclude that the current batch of quantum signals has been too badly disturbed enroute for any key to be safely agreed on.

The quantum channel consists of any means of transmitting two independent optical or other electromagnetic signals from sender to the receiver such as by way of two subchannels. These two subchannels must be mutually phase-coherent, meaning that if identical monochromatic signals are launched into the two subchannels, the phase difference at the output ends will be constant, or will vary slowly enough with time to be tracked and compensated by an active control mechanism. For example, in the unguided light beam realization to be described below, the two subchannels are two orthogonal polarization components of a light beam propagating along a common optical path through a non-birefringent medium. In the fiberoptic realization also described below, the two subchannels are provided by alternate time slots of a time-multiplexed transmission through a single-mode fiber. Mutual phase coherence of the subchannels results, in the former case, from lack of significant birefringence in the medium. In the latter case it results from the slow variation of optical path length compared to the frequency of time-multiplexing.

In use, the sender generates random bit sequence X and launches the corresponding modulated signals R(t) and S(t) into the two subchannels. Because the absolute phase of R and S is not controlled or measured, we take R to be real. In the examples we give, S will be real also, but this is not necessary. S/R in general will be a time-dependent complex number whose magnitude is the square root of the intensity ratio between S and R, and whose phase is the phase of S relative to R. The essential feature of the modulation scheme, allowing the sender and receiver to test for eavesdropping, is that the quantum channel transmissions corresponding to different X sequences should represent non-orthogonal quantum states, making it impossible in principle for an eavesdropper, even one equipped with ideal detection apparatus, to gain complete or near-complete information about the sender's secret bit sequence X by measuring the signals R and S.

In a previous QKD system for example C.H. Bennett et al in IBM Technical Disclosure Bulletin (1983) and C.H. Bennett in Phys. Rev. Lett. 68, 3121 (1992) the quantum nonorthogonality was achieved by making the signals very weak, for example by using optical signals of one expected photon or less. Here it is achieved by using macroscopic signals that are so weakly modulated (for example, optical signals of N>1 expected photons modulated by less than 1/$\sqrt{N}$ in relative phase or intensity) that the uncertainty principle still prevents them from being reliably distinguished.

Even if there is no eavesdropping, transmission through the quantum channel (and splitting among the several receiving units that may be connected to the channel) will generally attenuate the signals, and may add noise due to thermal or ambient background radiation. Further losses and noise will be introduced by the receiver's detection apparatus. However, because of the nonorthogonality of the signals leaving the sender, even a receiver with ideal detectors, listening to the signals through a lossless noiseless channel, could not determine the sender's sequence X reliably.

The use of nonorthogonal quantum signal states by the sender is not sufficient for secure key distribution; the receiver must also measure at least two non-commuting quantum observables on the received signals. Non-commuting observables are properties such as the real and imaginary parts of the electric field, or phase and amplitude, or rectilinear and circular polarization, which, owing to the uncertainty principle, cannot simultaneously have definite values.

If the receiver measured only one quantum observable, an eavesdropper could intercept signals on the way to the receiver, measure that observable, and substitute fake signals (eigenstates of the observable) designed to yield the same result when remeasured by the receiver as the result just obtained by the eavesdropper. The eavesdropper and receiver would thus be in possession of the same information as the receiver alone would have held had there been no eavesdropping, and secure key distribution would be impossible. When the legitimate receiver measures two non-commuting observables, this attack is prevented, because there is now no fake signal the eavesdropper could substitute that would accurately mimic the results of both measurements.

The need for two quantum subchannels is less fundamental, and results from the practical difficulty of controlling the absolute phase when an electromagnetic signal is sent over a long distance. The use of two signals in mutually phase-coherent subchannels allows non-orthogonal states to be prepared, and non-commuting measurements to be performed, involving the relative phase of the two signals, even though the absolute phases cannot be controlled reliably.

In contrast to the quantum channel, which must satisfy the physical requirements described above, the classical channel may be of any physical form. Moreover, while the quantum channel is designed to transmit signals that would yield incomplete information to an eavesdropper, the classical channel is assumed to be reliable and public in the sense that whenever any of the sending or receiving units injects a message into it, the exact contents of the message and the identity of its originator become known to everyone, including potential eavesdroppers, but this information cannot be changed enroute by anyone. When the protocol is being executed between a particular sending unit and a particular receiving unit, the other sending units must remain silent. Other receiving units may listen to the quantum and classical channel transmissions, but receiving units other than the one designated by the protocol will gain only negligible information about the key being shared between the designated sender and designated receiver. (If the public channel is not intrinsically immune to alteration of messages enroute, then standard mathematical authentication techniques, such as Wegman-Carter authentication, can be used by the sender and receiver to detect altered public channel messages, and the protocol aborted if any are found. Such techniques require the sender and receiver to have a small amount of shared secret key initially.)

To facilitate referring to them, the designated sending unit will henceforth often be called "Alice", and the designated receiving unit called "Bob". When necessary, a potential eavesdropper will be called "Eve." We describe the system in general terms, then give two realizations, suitable respectively for unguided light beams and fiberoptic channels.

The protocol consists of the following steps.

1. Using her random bit generator, the designated sender Alice chooses and records a secret random bit key sequence X. Because it is Alice's part of the raw material from which the cryptographic key K will ultimately be generated, X will be referred to as "Alice's raw key".

2. Using a publicly known modulation scheme, Alice uses her sequence X to prepare modulated signals R(t) and S(t) which she launches into the subchannels of the quantum channel.

3. The designated receiver Bob performs measurements of two noncommuting kinds on the arriving signals: 1) "major" measurements designed to yield information about Alice's sequence X, and 2) "minor" measurements designed to detect active eavesdropping attacks involving substitutions of major-measurement eigenstates for the legitimate signals. If the minor measurement results are consistent with the hypothesis that little or no such substitution has taken place, Bob continues; otherwise he aborts the protocol.

4. Alice and Bob exchange a number r of public messages $M_1, M_2, \ldots M_r$ through the classical channel, alternately originating from Bob and Alice. Bob's messages are computed by a publicly known algorithm from his major measurement results, true random numbers generated by him, and previous public messages from Alice. Alice's messages are computed by a publicly known algorithm from Alice's raw key X, true random numbers generated by her, and previous public messages from the Bob.

5. After the last public message has been received, Alice and Bob per form a further calculation, according to a publicly known algorithm, that with high probability allows Alice and Bob either to agree on a body K of final random key data on which any third party's expected information is much less than I bit, or else to agree that the attempted key distribution has failed. This calculation is further described in the section below on eavesdropping.

BRIEF DESCRIPTION OF THE DRAWINGS

These and other features, objects, and advantages of the present invention will become apparent upon a consideration of the following detailed description of the invention when read in conjunction with the drawings in which.

DESCRIPTION OF THE PREFERRED EMBODIMENTS

Figure 2:
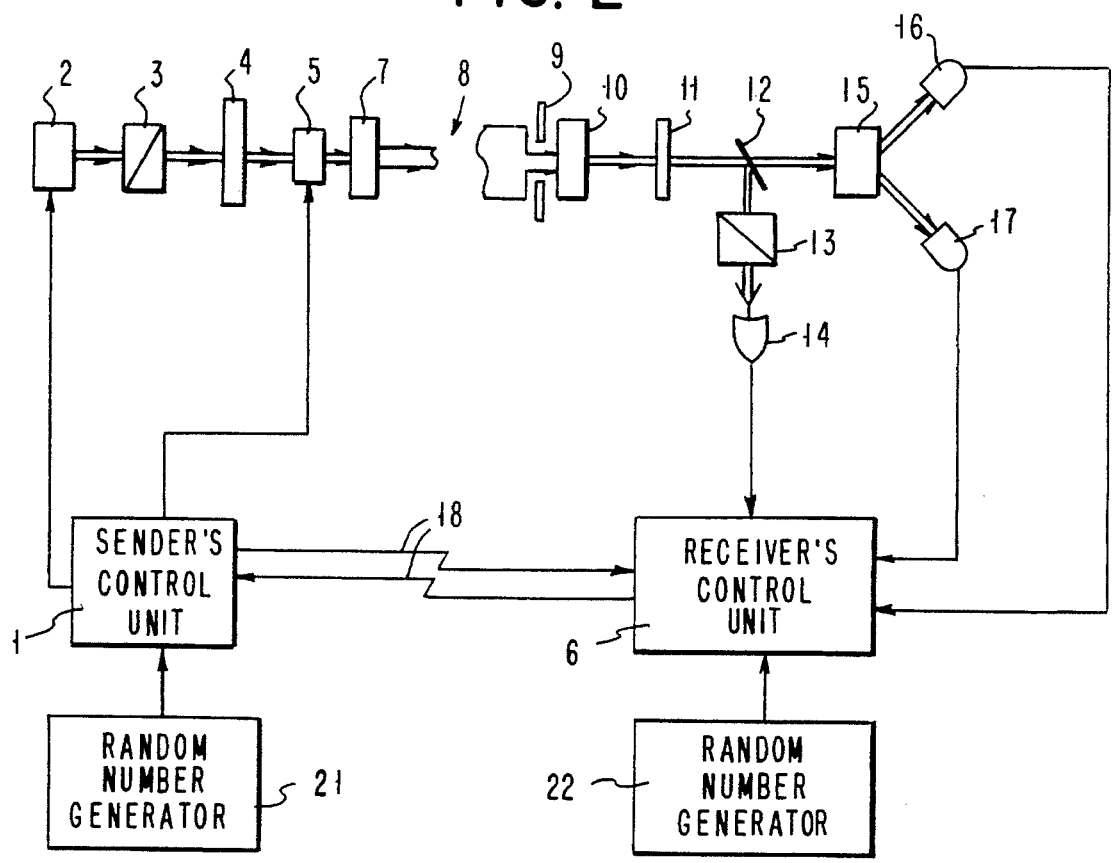
FIG. 2 is one embodiment of the invention.
Figure 3:
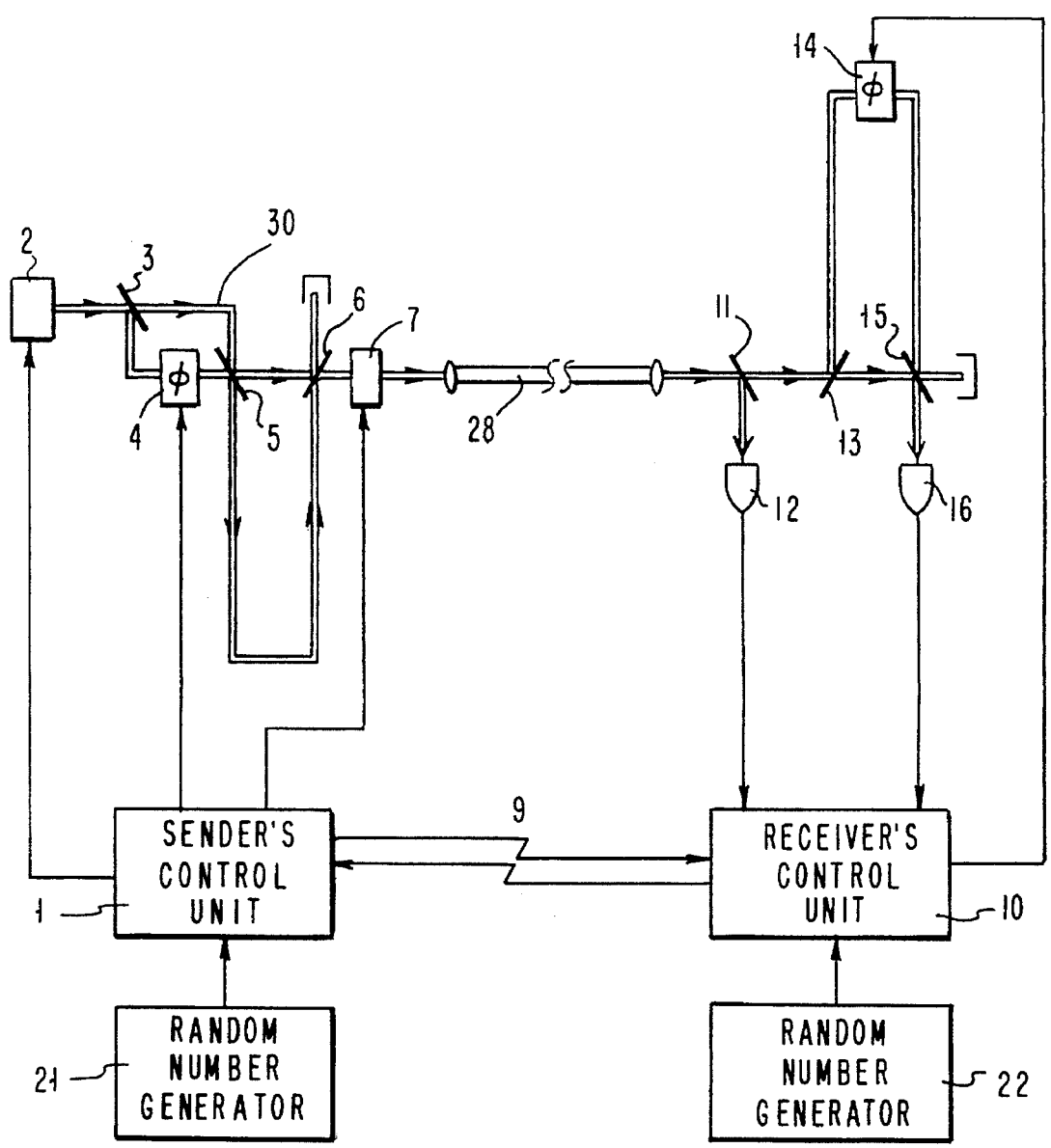
FIG. 3 is an alternate embodiment of the invention.

Referring now to the drawing, FIG. 2 is one embodiment of the invention and FIG. 3 shows an alternate embodiment of the invention.

In FIGS. 2 and 3, each bit of Alice's raw key X is encoded as a pair of macroscopic coherent light pulses, one in the R subchannel and one in the S subchannel. The two pulses comprising the j'th such pair have equal phase, but slightly different integrated intensity, determined by the value of the key bit X(j) being encoded.

A key bit of zero is represented by an R pulse of integrated intensity $N \cos^2(\pi/4-\delta)$ expected photons and an S pulse of integrated intensity $N \sin^2(\pi/4-\delta)$ expected photons. For a key bit of one, the intensities are reversed, the R pulse having integrated intensity $N \cos^2(\pi/4+\delta)$ expected photons and the S pulse having integrated intensity $N \sin^2(\pi/4+\delta)$ expected photons.

The modulation depth parameter $\delta$ is set in the range 0.1 to 0.5 times $1/\sqrt{N}$, thereby making the "0" signals and "1" signals imperfectly distinguishable even to an eavesdropper with ideal detectors. The total integrated intensity, N expected photons, is chosen large enough to obtain the advantages of macroscopic signals (greater resistance to stray light, the ability to use analog detectors), while not so great that fractional differences of order $\delta < 1/\sqrt{N}$ in signal intensity become difficult to measure owing to gain instability or limited precision of the detectors.

As noted earlier, the R and S subchannels represent two orthogonal polarization modes of a single light pulse in the unguided lightbeam realization, and two time-displaced pulses of the same polarization in the fiberoptic realization. In either case, the signals are treated in the same way at the receiving end of the channel, as described below.

In both realizations, Bob uses an unsymmetrical beamsplitter to split off a small fraction of the modulated signals reaching him for minor measurements, and uses the rest for major measurements. The major measurement is performed by detecting the S and R pulses in two separate square-law detectors, differencing the outputs, and recording, for each bit position j, a result $A(j)=I_S-I_R$, where $I_S$ and $I_R$ are the measured S and R intensities, integrated over the pulse duration. The minor measurement is performed by optically superposing the two signals to obtain a sum signal $P(t)=(S(t)+R(t))/\sqrt{2}$ and a difference signal $Q(t)=(S(t)-R(t))/\sqrt{2}$, detecting the difference signal in a third square-law detector, and recording a result $B(j)=I_Q$, where $I_Q$ is the measured Q component intensity, integrated over the pulse duration. The relation of the signals representing "0" and "1" key bits to the R, S, P, and Q axes is shown in FIG. 1.

Figure 1:
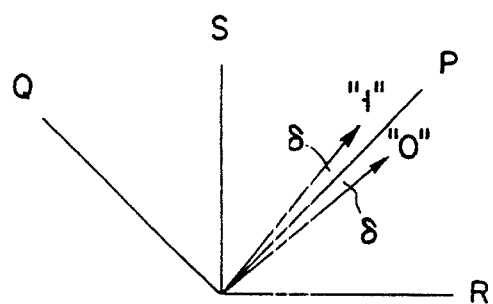
FIG. 1 is a graph showing to orthogonal axes R and S and two nonorthogonal signals "0" and "1"

In FIG. 1 the ordinate represents R and the abscissa represents S which is orthogonal to R.

The receiver Bob uses the major measurement results to produce his own best estimate of Alice's raw key X. This sequence $Y=Y(1), Y(2), Y(3), \ldots Y(m)$, henceforth called "Bob's raw key", will probably differ from Alice's raw key X in a substantial minority of bit positions. For each time slot j if the major measurement result A(j) is positive, Bob's raw key bit Y(j) is set to i, indicating that Alice's raw key bit is more likely to have been 1 than 0. By the same token, if A(j) is negative, the receiver's raw key bit Y(j) is set to 0. Allowing For an overall loss factor of L (including losses in transmission and imperfect quantum efficiency of Bob's detectors), and a non-quantum noise intensity of n expected photons per subchannel per time slot, and assuming no eavesdropping, the receiver's values of A(j), for signal pulses of types 1 and 0 respectively, will be distributed normally with mathematical means given by equation 1

$$\mu_A = \pm NL \sin 2\delta \quad (1)$$

and a variance given by equation 2

$$\sigma^2_A = 2n + NL \quad (2)$$

in either case. The first term in the above equation represents all potentially avoidable non-quantum noise sources, such as thermal and ambient light in the chanel, thermal dark current in the detectors, and amplifier noise; the second term represents the unavoidable quantum shot noise on which the security of the key distribution depends.

In the absence of eavesdropping, the minor measurement results B(j) should be distributed normally with a mean and variance given by equation 3.

$$\mu_B = \sigma^2_B = n + NL' \sin^2\delta \quad (3)$$

Here the loss factor L' includes the additional intensity loss introduced by splitting off only a small portion of the incoming intensity for minor measurements.

Because $\delta < 1/\sqrt{N}$, the second term in eq. 3 is very small (less than one photon), and the minor measurement variance will typically be dominated by the nonquantum noise term n. A major-measurement eigenstate, by contrast, would yield a much larger value of B(j), with a mean and variance each approximately equal to $n+(NL')/2$.

After the quantum signals have been sent and received, the sender and. receiver exchange public messages over the classical two-way channel. This public discussion has the following stages:

1. The receiver Bob determines whether the minor measurement results are small enough to be consistent with the hypothesis that at most a few of the signals have been replaced by major-measurement eigenstates. If not, i.e., if many of the legitimate signals appear to have been replaced enroute, the protocol is aborted.

2. As a further, interactive test of signal validity, the sender Alice, for a fraction $f$ of the time slots chosen at random, announces on the public channel which bit values X(j) she encoded during those time slots. Bob verifies that, to within acceptable statistical errors, the major measurement results for those time slots are normally distributed with means and variances given by equations 1 and 2 above. If not, the protocol is aborted. For large batch sizes m, only a small fraction of the raw key bits need to be sacrificed for this purpose.

3. Alice and Bob discard from their data those time slots used in the interactive validation test just described, then as described by C.H. Bennett and. G. Brassard, "Quantum Public Key Distribution System", IBM Technical Disclosure Bulletin 28, 3153–3163 (1985) which is incorporated herein by reference, apply a publicly chosen random permutation and complementation to the data from the remaining time slots, to obtain a "sender's intermediate key", X', and "receiver's intermediate key", Y', of length $(1-f)m$ bits. The resulting strings X' and Y' will be random, and will differ from each other at random locations ("crossovers") unknown to the sender. Bob, by contrast, has partial information on where the crossovers are, since they are more likely to occur the smaller the absolute intensity difference |A(j)|, which he has measured in his major measurement. Although neither Alice nor Bob know the exact number of crossovers, they can both estimate it from the parameters $\mu_A$ and $\sigma_A$, given in equations 1 and 2 and confirmed by the interactive validation test just described. In terms of these parameters, the expected crossover frequency is given by equation 4.

$$\epsilon = [1 - \mathit{erf}(\mu_A/(\sigma_A\sqrt{2}))]/2. \quad (4)$$

4. Having validated their data, Alice and Bob must now repair the crossovers, so as to obtain a single bit string, still at least partly secret, on which they both agree. One may take this to be Bob's version Y' of the intermediate key. To enable Alice to find and correct the crossovers, Bob uses a publicly agreed on post-facto error-correcting code C, as described in the publication by C.H. Bennett and G. Brassard above, C.H. Bennett et al., "Privacy Amplification by Public Discussion", *SIAM Journal on Computing* 17, 210–229 (1988) and U.S. Pat. No. 5,161,244 by U. Maurer which are incorporated herein by reference, to compute from his data Y' a body of error-correction information C(Y') sufficient to enable Alice, with high probability, to correct the anticipated number or crossovers. In an interactive dialog with Alice, he supplies, over the public channel, as much of this information as she finds she needs to find a plausible single candidate for Bob's intermediate key Y'.

5. Alice and Bob publicly compare parities of a few publicly chosen random subsets of the bits in their versions of Y', as described in the publication by C.H. Bennett et al., *J. of Cryptology* 5, 3–28 (1992) which is incorporated herein by reference, to convince themselves that with overwhelmingly high probability no uncorrected crossovers remain, while leaking only a few bits more bits to potential eavesdroppers. Alice and Bob will then be in possession of a single string Y' of length $m'=(1-f)m$ bits, on which they have complete information, while the eavesdropper, it is hoped, still has only partial information.

6. From the signal parameters N and $\delta$, the noise n and loss L, and the amount of error-correction information transmitted from Bob to Alice, Bob and Alice estimate the maximum plausible information on Y' an eavesdropper could have gained through undetected eavesdropping on the quantum transmissions and listening to the public discussion. The estimation technique is described in the publications C.H. Bennett and G. Brassard (1985) above, C.H. Bennett et al above and C.H. Bennett and G. Brassard (1988) above. If the estimated information leakage is significantly less than the intermediate key's full information content of m' bits, Alice and Bob use the technique of privacy amplification to derive from Y' a considerably shorter string K, the "final key", on which any eavesdropper's expected information is a negligibly small fraction of one bit. If, on the other hand, too much information may have leaked to an eavesdropper, Alice and Bob conclude that the key distribution attempt has failed.

Referring to FIGS. 1 and 2, Alice encodes each bit of her sequence X as a pulse of coherent light linearly-polarized light of N expected photons integrated intensity and polarization $\pi/4-\delta$, or $\pi/4+\delta$, according to the value, 0 or 1 respectively, of the bit being encoded. See FIG. 1. The signals R(t) and S(t) in the general description thus correspond to the sequence of horizontal and vertical polarization components, respectively. The pulses are made under the control of a sender's control unit (1), by a pulsed coherent source such as a laser or laser diode (2), then sent through a fixed polarizer (3), an attenuator (4), and into a polarization modulator such as Pockels cell (5), where the polarization of individual pulses is modulated to 45 degrees $\pm\delta$ radians at random under the control of the sender's control unit (1). The sender's control unit includes a physical (true, not pseudo-) random number generator 21 to make these choices, and sufficient memory and processing capability to record the choices and execute subsequent steps or the key distribution protocol in conjunction with a similar unit (6) at the receiving end of the channel.

The signals pass via a beam expander (7) into an unguided light beam (8) directed toward the receiver. If the light beam passes through a medium such as air, the medium must not significantly perturb the polarization of the beam. On the other hand, considerable loss L due to attenuation and beam spreading, and considerable random background noise n, due to stray light or detector noise, can be tolerated at the cost of reducing the key distribution rate, provided that the signal intensity NL at the receiving end is still macroscopic (>>1 expected photon), and still large compared to the noise intensity n.

At the receiving end, that portion or the beam collected by entrance pupil (9) is reduced to convenient diameter by a beam reducer (10), and passed through a narrow-band interference filter and/or etalon (11) to remove stray light outside the band emitted by the source.

A small fraction of the beam intensity is then diverted for minor measurements by a non-polarizing beamsplitter (12) through a 135 degree diagonal polarizer, (13), and the intensity of that polarization component, $I_Q$ is measured by a high-efficiency, low-noise detector (14), such as a photomultiplier (PMT), avalanche photodiode (APD) or metal-semiconductor-metal device (MSM), and the resulting data recorded in the receiver's control unit (6) for use in the non-interactive key-validation test.

Meanwhile the bulk of the incoming intensity is subjected to a major measurement. To do so it is separated into 0 and 90 degree polarization components by a polarizing beamsplitter (15) and the two intensities measured by two additional detectors (16 and 17) similar to detector (14). The outputs of these detectors, representing the $I_R$ and $I_S$ intensities, are used by the receiver's control unit (6) for key estimation, as described above.

Finally, the key calculation protocol is carried out between the sending (1) and receiving (6) control units by exchange of public messages through a two-way public channel (18) connecting them.

FIG. 3 shows an alternate embodiment of the invention wherein the quantum channel is an optical fiber 28. In FIG. 3 like references are used for functions corresponding to the apparatus of FIG. 2. In FIG. 3, each signal is a pair of temporally separated coherent pulses of fixed phase relation but with an intensity ratio depending on the signal type. Signals encoding the key bit "0" consist of pulse pairs with the intensity $N \cos^2(\pi/4-\delta)$ expected photons for the first pulse and a slightly lesser intensity $N \sin^2(\pi/4-\delta)$ for the second. Signals encoding the key bit "1" consist of pulse pairs with the opposite intensities, ie $N \cos^2(\pi/4+\delta)$ expected photons in the first pulse and $N \sin^2(\pi/4+\delta)$ in the second.

In an optical fiber 28, stray light is usually no problem, but the use of macroscopic pulses with $N>1$ permits the use of analog detectors which are faster and less noisy than single-photon detectors at wavelengths greater than 1300 nm, where fibers are most transparent. As in other QKD systems involving pairs of pulses propagating in tandem through a long fiber, good interference can be obtained between the pulses at the downstream end because the two pulses of a pair are almost equally affected by optical path length fluctuations in optical fiber 28.

To produce the pulse pairs, a sender's control unit (1), incorporating a true random number generator (21), causes a pulsed coherent light source (2) such as a laser or laser diode, to emit brief (1 ns or less) pulses into a small, balanced Mach-Zehnder interferometer 30 consisting of symmetric beamsplitter (3), phase modulator (4), and symmetric beamsplitter (5). Modulation of the phase by high speed modulator (4) under control of the sender's control unit (1) modulates the relative intensity of the two beams leaving beamsplitter (5) in the downward and rightward directions. The downward beam is delayed by a fixed amount $\Delta t$, then recombined with the other beam at symmetric beamsplitter (6). The optical delay $\Delta t$ is made longer than the pulse duration, but shorter than the pulse repetition rate, so that no interference takes place at beamsplitter (6). Instead this beamsplitter has the effect of merging the two pulses, whose intensity ratio has been modulated by modulator (4), into a single beam with a fixed temporal delay of $\Delta t$. One of the beams leaving beamsplitter (6) is discarded; the other is attenuated by variable attenuator (7) to the desired intensity level of N expected photons per pulse pair, and launched into a fiberoptic channel 28.

Besides the fiberoptic channel 28, the sending and receiving ends of the apparatus are connected by a two-way classical channel (9), used for the public discussion stages of the key distribution protocol. A receiver's control unit (10) collects data from the receiving end of the apparatus and handles communications with the sender's control unit (1).

Most of the optical signal leaving the fiber is diverted by an unsymmetric beamsplitter (11) into a fast, efficient, low-noise photodetector (12), such as an APD or MSM, which measures and transmits to the control unit (10) the intensities $I_R$ and $I_S$ of the first and second members of each pulse pair. This information is used as described above for key estimation. A small fraction of the incoming intensity passes to symmetric beamsplitter (13), producing two beams of equal intensity each containing a time-separated pulse pair. One of these beams (leaving 13 in the upward direction) is delayed by the very nearly the same amount as the delay introduced between beamsplitters 5 and 6 in the sending apparatus. A variable phase shifter (14) is included in the long path to allow the phase difference between these two delays to be hulled to within a small fraction of a wavelength, despite environmental drift in the optical delays. The signal returning from the sender's delay is combined with the undelayed signal by an symmetric beamsplitter (15) so as to produce two beams, one of which is discarded while the other is measured by a detector (16) similar to detector 12. The signal entering this detector consists of three temporally separated pulses, the middle one of which represents the difference mode intensity $I_Q$ which must be measured to perform the non-interactive signal-validation test described above. During alignment of the apparatus, the variable attenuator (7) can be set to transmit a relatively high intensity $\gg N$ photons per pulse, thereby facilitating correct adjustment of the various phase delays. Correct alignment is indicated when the phase shifts applied at modulator 4 give the desired intensity ratios $I_S/I_R$ at detector 12 between the two temporally separated components of a pulse pair, and when phase shifter 14 is adjusted to minimize the middle pulse's intensity at detector 16.

Neutralization and detection of eavesdropping is discussed below.

The discussion is in terms of the unguided light beam system for concreteness. All these remarks apply as well to the fiberoptic realization. Two kinds of eavesdropping: intercept/resend and beamsplitting are considered below.

The above QKD system provides a means of detecting attacks in which an eavesdropper "Eve" intercepts Alice's signals in transit, measures them, and resends substitute signals to Bob. If the substitute signals are of the same form as Alice's original signals (ie $\pi/4\pm\delta$ polarization), such an intercept/resend attack will cause Eve to resend the wrong kind of signals some of the time, which in turn will cause excessive skew and variance in the distributions of AU) compared during the interactive signal validation test. Instead Eve might fabricate a very different kind of pulse, termed earlier an eigenstate of the key estimation observable, and designed to exactly reproduce for Bob the $I_S-I_R$ value Eve just obtained. Such a pulse (for example, a photon number state with Is vertical photons and In horizontal photons), would be detected by the minor measurements, giving a grossly wrong value of $1_Q$. The main subtlety in protecting from an intercept/resend attack occurs when Alice and Bob are ignorant of what noise power to expect, giving the eavesdropper some scope to eavesdrop on some of the pulses, while injecting the right amount of biased noise to combat the skew introduced by eavesdropping, and produce an overall effect similar to an amount of unbiased noise that is not actually present.

The other kind of eavesdropping, termed beamsplitting, occurs when Eve intercepts part of Alice's signal power and lets the rest pass undisturbed to Bob. Since Eve resends nothing, this attack produces no effect on Bob's signal except loss in intensity. Indeed, in the light beam realization, there need be no loss of intensity if Eve intercepts a part of the beam falling outside Bob's entrance pupil.

In previous QKD schemes discussed above such as C.H. Bennett (1992) involving single photons and low intensity pulses, the low intensity provides an easy defense against the beamsplitting attack: most of the photons detected by Bob fall in time slots where nothing was detected by Eve, and conversely. Therefore, most of photons contributing to the key agreed upon between Alice and Bob are uncorrelated to any photon received by Eve. In the present macroscopic case, this defense no longer works. One must instead assume that Eve has tapped into the channel so as to obtain a measurable signal from every pulse emitted by Alice. One has in effect two channels carrying duplicate signals, one going from Alice to Bob and the other from Alice to Eve. If Eve inserts her tap near the upstream end of a channel with considerable attenuation, (or intercepts a larger part of Alice's light beam than Bob) the wiretap channel to Eve may be considerably better (have less attenuation and noise) than the legitimate channel to Bob.

Nevertheless, if Alice's original macroscopic signals are sufficiently similar, with $\delta < 1/\sqrt{N}$, Eve's channel will suffer from some unavoidable quantum noise independent of the noise in the channel from Alice to Bob.

Therefore, if Bob and Alice execute the post-facto error-correction protocol described above, where Alice corrects her intermediate key to match Bob's rather than the other way around, the eavesdropper in effect sees Bob's data through two cascaded noisy channels. Because of this, an amount of error-correction information sufficient to enable Alice to infer Bob's intermediate key exactly may not be enough to allow Eve to do so. Indeed, by appropriate choice of the modulation parameter $\delta$ and post-facto error-correcting codes, it is generally possible for Bob to enable Alice to infer his intermediate key exactly, while keeping Eve partly ignorant of it.

Typical parameter values and key generation rate are discussed below. Here we compute the data rate for a typical set of parameter values in the unguided lightbeam realization described above. The same parameters could be used, with equivalent results, in the fiberoptic realization. In common with other QKD systems, the data rate is rather low, in the sense that rather large volumes of public channel and quantum channel communication are needed per bit of certifiably secret key agreed on between Bob and Alice. For the parameter values considered below, several hundred optical pulses and a few thousand bits of public channel communication are required per bit of final key. The noisier and lossier the quantum channel, the lower the rate of key generation.

We take the pulse intensity to be N=10,000 expected photons, and the modulation parameter to be $\delta=0.2/\sqrt{N}=0.002$, corresponding to a polarization angle difference, between "0" pulses and "1" pulses, of $2\delta$ or 0.004 radians. We assume a 10 dB loss in the channel from Alice to Bob, giving a loss parameter L=0.1. Therefore, each pulse arriving at the receiver has an intensity of 1000 expected photons. We assume a noise parameter of n=10 expected photons per subchannel per per time slot, corresponding to a background light intensity and/or detector noise equivalent to 20 unpolarized photons per time slot. Bob's major measurement results $A(j)=I_S-I_R$ will then have means of $\mu_A=\pm 4.0$ photons, for "1" and "0" pulses, respectively, and a standard deviation of $\sigma_A=31.9$ photons in either case, giving a crossover frequency $\epsilon=0.4297$ between Alice's and Bob's versions of the raw key, and consequently between their versions of the intermediate key remaining after interactive signal validation.

We assume that the minor measurements and interactive signal validation tests have been performed and indicate no significant intercept/resend eavesdropping. The task remaining to Alice and Bob is then to correct the crossovers between their intermediate keys, estimate the amount of information that Eve may have gained through beamsplitting and through listening to the public discussion, and then to use privacy amplification to distill a secret final key from the only-partly-secret intermediate key.

Using convolutional coding as described in the publication by C.H. Bennett et al. (1988) above, Bob can enable Alice to correct all the crossovers in her version of the intermediate key X' by supplying $\log_2(1+\sqrt{(4\epsilon(1-\epsilon))})=0.9929$ bits of public error-correction information per bit of the intermediate key. Therefore, after the errors have been corrected, Alice has complete information on Bob's intermediate key, but Eve's information on Bob's intermediate key, gained through listening to the public channel, is at most 0.9929 m' bits, where m' is the length of the intermediate key.

Eve can also gain indirect information about Bob's key by a beamsplitting attack, in which she listens to Alice's signals with ideal detectors near the upstream end of the quantum channel, so that she receives a noiseless, unattenuated version of the signal emitted by Alice. With the parameters above, she will receive pulses of 10,000 expected photons, yielding major measurement values, for "1" and "0" bits respectively, with means of $\pm 40.0$ and standard deviation 100.0, giving an Alice-Eve crossover frequency 0.2858. While this is relatively low, it must be cascaded with the Alice-Bob crossover frequency of 0.4297 to obtain the Bob-Eve crossover frequency. The result, $0.2858\times(1-0.4297)+(1-0.2858)\times(0.4297)=0.4699$, is so close to ½ that it gives Eve only a little information about Bob's key. Eve's information on Bob's key gained through the beamsplitting attack would be exactly $1-H(0.4699)=0.00262$ bits per intermediate key bit if she considered only the sign but ignored the magnitude of her $I_R-I_S$ measurements, which contains additional information about Alice's key bits. Exploiting this additional information increases the capacity of the Eve-Alice stage of the cascade by a factor between 1 and $\pi/2$, but has no effect on the Alice-Bob stage, since Bob does not announce the magnitude information from his measurements. Allowing for Eve's use of magnitude information, the information on Bob's intermediate key available to her through beamsplitting is less than 0.00388 bits per intermediate key bit.

The information available to Eve on Bob's intermediate key through both kinds of eavesdropping (beamsplitting and monitoring the error-correcting discussion over the public channel) is no greater the sum of that available through the two sources separately, or 0.99292+0.00388=0.99670 bits per bit of intermediate key. Consequently, through privacy amplification as described in the publication by C.H. Bennett et al (1992) above and C.H. Bennett et al (1988) above, Alice and Bob, for sufficiently large intermediate key length m', can derive from their large intermediate key approximately m'×(1−0.99670)=0.0033 m' bits of highly secret final key.

In general, where there is no noise, a modulation depth parameter $\delta=0.2/\sqrt{N}$, in conjunction with post-facto convolutional codes for error-correction, yields a secret capacity (final key length)/(intermediate key length) of approximately 0.035 L, where L is the loss factor. A small amount of unbiased noise n<NL/10 decreases this capacity only slightly.

1. The invention provides for the derivation of a secure cryptographic key from the transmission of macroscopic signals that differ enough in their macroscopic parameters to carry a useful amount of key information between the legitimate users, but not enough to be reliably monitored by an eavesdropper with ideal measuring apparatus.

2. The invention further provides For the derivation of cryptographic key information from signals that are of sufficiently high intensity to be detected by analog detectors.

3. The invention further provides for the use of a dual detection system to perform two non-commuting measurements on the macroscopic signals, for example measuring both the intensity of the difference and the difference of the intensities of two mutually phase-coherent signal components, in order to detect substitution of fake signals by an eavesdropper.

While there has been described and illustrated a quantum key distribution system using macroscopic signals (from 1 to $10^{10}$ photons), it will be apparent to those skilled in the art that modifications and variations are possible without deviating from the broad scope of the invention which shall be limited solely by the scope of the claims appended hereto.

Having thus described our invention, what we claim as new and desire to secure by Letters Patent is:

1. A communications system comprising
    a. one or more sending units, each including a physical means of generating a random bit sequence X=X(1), X(2), X(3) . . . X(m), and including a means of modulating two macroscopic electromagnetic signals R(t) and S(t), where t denotes continuous time in a manner determined by the bit sequence X, but in such a way that the signal pairs corresponding to different bit sequences X are non-orthogonal as quantum states, whereby it is impossible in principle for an eavesdropper, even equipped with ideal measuring apparatus, to determine the sequence X reliably by monitoring the signals R(t) and S(t)
    b. one or more receiving units, each also containing a physical means of generating random bits, and each including means for making measurements of at least two non-commuting kinds on arriving signals R and S,
    c. a quantum channel connecting each said sending unit to each said receiving unit, said quantum channel having two mutually phase coherent subchannels, of which one is used to carry the signal R(t) and the other the signal S(t), and
    d. a two-way channel for transmitting non-secret messages between any sending unit and any receiving unit.

2. The communication system of claim 1 further comprising a protocol for coordinating the use of said sending units, receiving units, quantum channel and public channel, and means within the sending and receiving units for executing this protocol, such that after the protocol is executed between a designated one of the sending units and a designated one of the receiving units, said two designated units either
    will have agreed on a body of cryptographic key information which is shared between said two units, but secret from all other units and from any eavesdropper who may be monitoring the quantum and public channels, or else
    will have concluded that the batch of quantum signals sent between them during the current session of execution of the protocol has been too badly disturbed enroute for any key to be safely agreed on.

3. The communication system of claim 1, wherein said the two quantum subchannels are vertical and horizontal polarization components of an unguided light beam.

4. The communication system of claim 1, wherein said means of modulation produces, for each bit of the sender's sequence X, a coherent or incoherent light pulse of integrated intensity N>1 expected photons and polarization axis (in radians) $(\pi/4+\delta)$ or $(\pi/4-\delta)$, depending on whether the bit is "1" or "0".

5. The communication system of claim 4 wherein said pulse intensity N may be any fixed number greater than 1, and the angle $\delta$ may be any fixed angle less than $1/\sqrt{N}$ radians whereby the smallness of $\delta$ relative to $1/\sqrt{(N)}$ makes the "0" and "1" pulses impossible for an eavesdropper to distinguish reliably, according to the uncertainty principle, even though each pulse consists of many photons.

6. The communication system of claim 1 wherein said means for making noncommuting measurements include means for measuring the vertical intensity, horizontal intensity, and 135-degree diagonal $(3\pi/4)$ intensity of each arriving unguided light pulse.

7. The communication system of claim 1 wherein said R and S signals are carried by left and right circularly polarized components.

8. The communication system of claim 1 wherein said two quantum subchannels are provided by alternate time slots in a time-multiplexed transmission through a single mode optical fiber.

9. The communication system of claim 8 wherein said means of modulation produces, for each bit of the sender's sequence X, a pair of time-offset but phase-coherent pulses of integrated intensity $N \sin^2(\pi/4\pm\delta)$ photons each, with the brighter pulse coming first or second depending on whether the X bit being encoded is "0" or "1".

10. The communication system of claim 8 wherein said parameter $\delta$ is chosen smaller than $1/\sqrt{(N)}$ to make the "0" pulses and "1" pulses impossible in principle for an eavesdropper to distinguish reliably even though each pulse consists of many photons.

11. The communication system of claim 8 wherein said noncommuting measurements made by the receiving unit on each arriving pulse pair are measurements of the first pulse's integrated intensity, the second pulse's integrated intensity, and the intensity of a pulse made by interferometrically subtracting the first and second pulses.

12. A method for quantum key distribution from a sender unit to a receiver unit comprising the steps of
    modulating two macroscopic electromagnetic signals R(t) and S(t), where t denotes continuous time in a manner determined by the bit sequence X, but in such a way that the signal pairs corresponding to different bit sequences X are non-orthogonal as quantum states, making it impossible in principle for an eavesdropper, even equipped with ideal measuring apparatus, to determine the sequence X reliably by monitoring the signals R(t) and S(t),
    transmitting said two macroscopic electromagnetic signals R(t) and S(t) to said receiver,
    said receiving unit generating random bits, and making measurements of at least two non-commuting kinds on arriving signals R and S, and
    transmitting non-secret messages between said sending unit and said receiving unit.

13. The method of claim 12 wherein said step of transmitting includes the step of
    coordinating the use of said sending unit, receiving unit, quantum channel and public channel, and executing a protocol, such that after the protocol is executed between said sending unit and said receiving unit, said two units either
        will have agreed on a body of cryptographic key information which is shared between said two units, but secret from all other units and from any eavesdropper who may be monitoring the quantum and public channels, or else will have concluded that the batch of quantum signals sent between them during the current session of execution of the protocol has been too badly disturbed enroute for any key to be safely agreed on.

14. The method of claim 13 further including the step of coordinating the use of said sending unit, receiving unit, quantum channel and public channel, and executing a protocol, such that after the protocol is executed between said sending unit and said receiving unit, said two units either will have agreed on a body of cryptographic key information which is shared between said two units, but secret from all other units and from any eavesdropper who may be monitoring the quantum and public channels, or else will have concluded that the batch of quantum signals sent between them during the current session of execution of the protocol has been too badly disturbed enroute for any key to be safely agreed on.

15. The method of claim 12 wherein said step of modulating includes the step of producing for each bit of the sender's sequence X, a coherent or incoherent light pulse of integrated intensity $N>1$ expected photons and polarization axis (in radians) $(\pi/4+\delta)$ or $(\pi/4-\delta)$, depending on whether the bit is "1" or "0", where the pulse intensity N may be any fixed number greater than 1, and the angle a may be any fixed angle less than $1/\sqrt{N}$ radians.

* * * * *